US011908284B2

(12) United States Patent
Nelson et al.

(10) Patent No.: US 11,908,284 B2
(45) Date of Patent: Feb. 20, 2024

(54) COMBINING SPORTS WAGERING AND TELEVISION SPORTS AND RELATED SYSTEMS AND METHODS

(71) Applicant: IGT, Las Vegas, NV (US)

(72) Inventors: Dwayne Nelson, Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 113 days.

(21) Appl. No.: 17/548,933

(22) Filed: Dec. 13, 2021

(65) Prior Publication Data

US 2023/0186732 A1   Jun. 15, 2023

(51) Int. Cl.
*G07F 17/32* (2006.01)
*H04N 21/81* (2011.01)
*H04N 21/43* (2011.01)
*H04N 21/414* (2011.01)
*H04N 21/242* (2011.01)
*H04N 21/478* (2011.01)

(52) U.S. Cl.
CPC ........ *G07F 17/3288* (2013.01); *G07F 17/323* (2013.01); *G07F 17/3211* (2013.01); *G07F 17/3276* (2013.01); *H04N 21/242* (2013.01); *H04N 21/41407* (2013.01); *H04N 21/43074* (2020.08); *H04N 21/4781* (2013.01); *H04N 21/812* (2013.01)

(58) Field of Classification Search
CPC ............. G07F 17/3288; G07F 17/3211; G07F 17/323; G07F 17/3276; H04N 21/242; H04N 21/41407; H04N 21/43074; H04N 21/4781; H04N 21/812
See application file for complete search history.

(56) References Cited

U.S. PATENT DOCUMENTS

| 11,657,578 B2* | 5/2023 | Jayaram | ................ G06T 19/006 |
| | | | 345/419 |
| 2021/0350669 A1* | 11/2021 | Marantelli | .......... G07F 17/3276 |
| 2022/0270446 A1* | 8/2022 | Inamdar | ............... G06Q 20/401 |
| 2022/0292919 A1* | 9/2022 | Edsall | ................. G07F 17/3227 |
| 2022/0301396 A1* | 9/2022 | Laster | ................. G07F 17/3213 |

* cited by examiner

*Primary Examiner* — Ronald Laneau
(74) *Attorney, Agent, or Firm* — Sage Patent Group

(57) ABSTRACT

A system, computer-implemented method and gaming device are provided. A method includes receiving, by a synchronization server, broadcast event data that is displayed on an electronic display and that is generated by a television broadcasting system, receiving, by the synchronization server, sports wagering system data that is generated by a sports wagering system and that corresponds to a broadcast event, generating synchronized wager data that includes broadcast event data and the sports wagering system data and causing the sports wagering system data to be displayed on the electronic display.

16 Claims, 11 Drawing Sheets

| Leaderboard | |
|---|---|
| Bettor 1 | $525 |
| Bettor 2 | $475 |
| Bettor 3 | $470 |
| Bettor 4 | $120 |

COMBINING SPORTS WAGERING AND TELEVISION SPORTS AND RELATED SYSTEMS AND METHODS

BACKGROUND

Embodiments described herein relate to providing opportunities for betting on events. Events, such as sporting events have many aspects that make them attractive to spectators, both from an entertainment standpoint and a wagering and/or betting standpoint. Sports wagering on mobile devices, such as user associated terminals, continues to increase. As technology improves and as the competition for the attention of bettors increases, there is a need for an improved interface for sports wagering on mobile devices.

SUMMARY

According to some embodiments, methods includes operations of receiving, by a synchronization server, broadcast event data that is displayed on an electronic display and that is generated by a television broadcasting system, receiving, by the synchronization server, sports wagering system data that is generated by a sports wagering system and that corresponds to a broadcast event, generating synchronized wager data that includes the broadcast event data and the sports wagering system data, and causing the sports wagering system data to be displayed on the electronic display.

According to some embodiments, a server includes a processor circuit and a memory coupled to the processor circuit. The memory includes machine readable instructions that, when executed by the processor circuit, cause the processor circuit to operate to operations including synchronizing broadcast event data that is displayed on an electronic display with wagering system data that is provided by a wagering system to provide synchronized wagering data and receiving, via a mobile device, a wagering input that corresponds to the synchronized wagering data.

Some embodiments are directed to a mobile device that includes a processor circuit and a memory coupled to the processor circuit. The memory includes machine readable instructions that, when executed by the processor circuit, cause the processor circuit to receive sports wagering system data from a sports wagering service, receive broadcasting event data that is provided by a television broadcasting service, generate synchronized wager data that causes an electronic display to display a broadcasting event corresponding to the broadcast event data and sports wager data that is associated with the broadcast event, send the synchronized wager data to the electronic display and receive a wagering input that corresponds to the synchronized wagering data.

BRIEF DESCRIPTION OF THE DRAWINGS

FIG. 10 is a schematic block diagram illustrating a display of a leaderboard according to some embodiments herein.

DETAILED DESCRIPTION

Sports wagering on mobile devices has experienced steady growth, however mobile application design and event coordination have not kept up. Mobile sports wagering applications may have historically operated without reference to broadcasts of the underlying wagering event.

This disclosure describes how a bettor may use a mobile sports wagering application and synchronize the sports wagering experience with live sports on a television. In some embodiments, the sports wagering can be traditional wagering on the outcome of an event. Some embodiments provide that the sports wagering can be "in-game" wagering in which the bettor wagers on the outcome of the next period and/or event in the game, such as, for example, wagering if the next batter will strike out.

Figure 1:
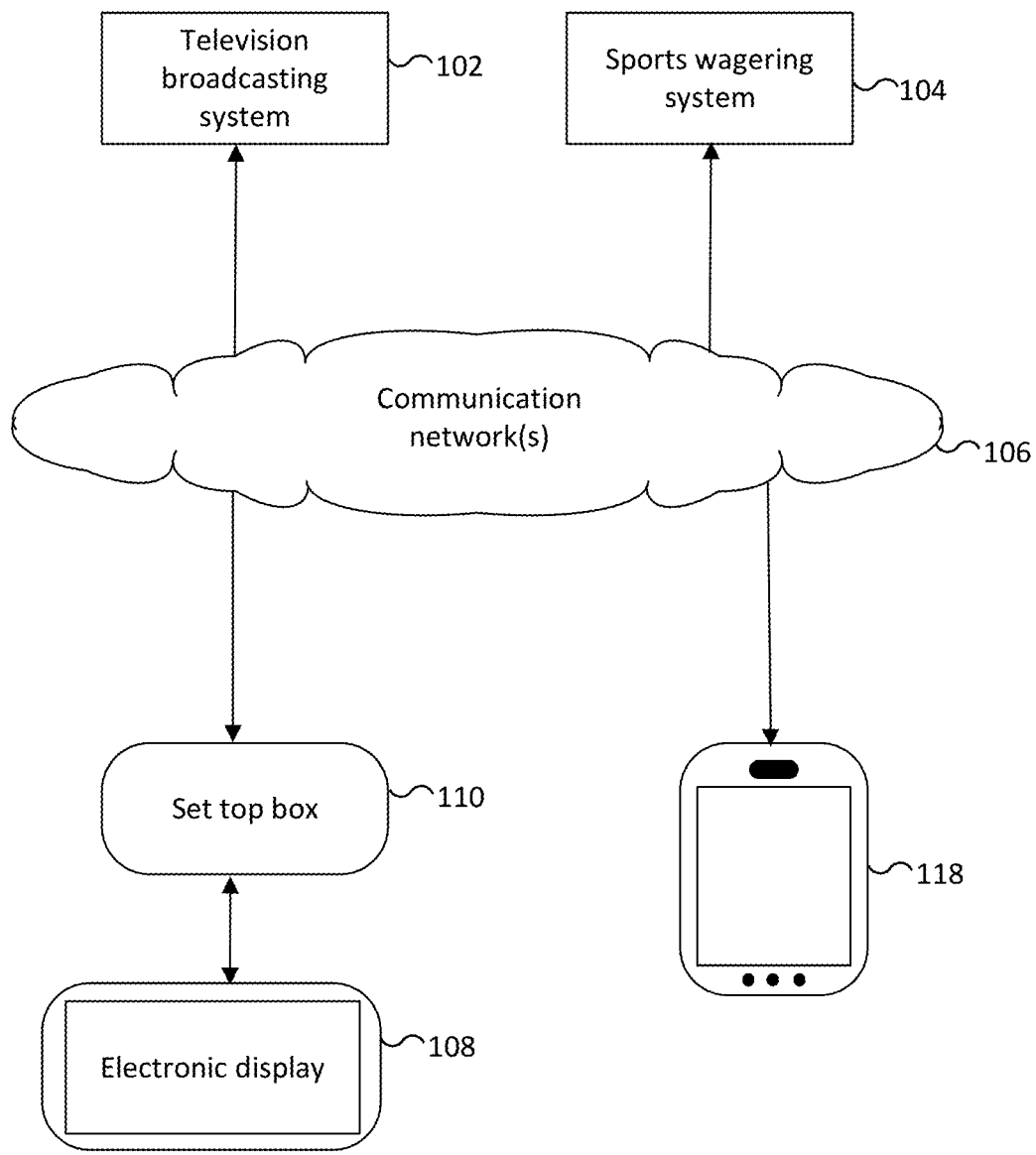
FIG. 1 is a schematic block diagram illustrating a system according to some embodiments.

Some embodiments include viewing a sporting event via a television combined with sports wagering. For example, reference is made to FIG. 1, which is a schematic block diagram illustrating a system according to some embodiments. A system 100 may include a television broadcasting system 102 that is configured to provide broadcast media programming. Examples of broadcast media programming include events, such as sporting events and/or other events that may provide wagering opportunities, among others. Sporting events may include team and individual sports such as soccer, football, baseball, basketball, tennis, golf, racing, and/or any sport played in a winter or summer olympic context.

Broadcasted events may be sent from the television broadcasting system to a television, computer monitor and/or video monitor, among others. As used herein, the term electronic display 108 will include and be used interchangeably with the television, computer monitor and/or video monitor, among others. In some embodiments, the broadcast event data may be sent to the electronic display 108 via one or more communication networks 106 that may include wireless and/or wired internet, LAN, WAN, cable, and/or satellite networks, among others. Some embodiments provide that the broadcast event data is provided to the electronic display 108 through one or more set top boxes 110 that may be configured to decode and/or decrypt the broadcast event data.

Some embodiments provide that a sports wagering system 104 may be configured to identify and transmit wagering opportunities, options and/or terms, to receive wagers, and/or to report wager outcomes, among others. In some embodiments, the sports wagering system 104 may communicate with potential bettors via a mobile device 118, such as a mobile telephone, personal digital assistant, tablet and/or laptop, among others. In some embodiments, the sports wagering system 104 may also communicate with potential bettors using a desktop computer. Some embodiments provide that the mobile device 118 may include one or more applications that provide communication with the sports wagering system. In some embodiments, communication between the sports wagering system, 104 and the mobile device may be provided via one or more communication networks 106 that may include wireless and/or wired internet, LAN, WAN, cable, and/or satellite networks, among others that may be the same or different from the networks 106 used by the television broadcasting system 102.

In some embodiments the mobile device 118 may communicate directly with the set top box 110 or with the electronic display 108. It some embodiments, the functionality of the mobile device is achieved via an application on the set top box or electronic display 108, typically in conjunction with touch interface, audio interface, or secondary device that supports the user interfacing with the on-screen display of the set top box or television 108, such as a remote-control device. In some embodiments, the sports wagering system 104 has connections to other systems such as a sports outcome service, like BetRadar.

As provided herein, a bettor may be provided with easy methods for placing sports wagers by combining the broadcast event data on the television and the wagering system data on the mobile device 110. For example, some embodiments provide that the mobile device 118 is synchronized to the event being watched on the television. For example, if the television is displaying a baseball game between the San Francisco Giants and the Los Angeles Dodgers (the sporting event), the mobile device application is notified such that it presents the bettor sports wagering opportunities corresponding to that exact game. For example, the mobile device application could show the bettor the odds and a user interface for placing a wager on the winner of the current game and/or an in-game event (e.g., who will score next?) The mobile device 118 may learn the current sporting event on the television by wirelessly communicating with the television and/or set top box. These wireless communications could be WIFI, Bluetooth, NFC, etc. In some embodiments, the mobile device 118 can also learn about the currently displayed sporting event by synchronizing with a back-end component of the set top box, and/or an app running on the television 108 and/or set top box 110. For example, the mobile device may "pair" with a component of the television 108 (set top box 110, app of the television, and/or app of the set top box) and be notified by a back-end component that the television synchronizes with (typically over the internet) when the state of the television 108 is changed.

When the event on the television 108 changes the mobile device 110 is notified. This could happen if the television channel is changed, or a new event is presented (e.g., the current event ends and the next sporting event starts).

In some embodiments, the television and/or set top box shows multiple events at a time. In such embodiments, the mobile device 118 may show the bettor multiple wagering opportunities corresponding to the multiple events.

In some embodiments, the mobile device 118 may be present around multiple televisions and/or multiple set top boxes. In such embodiments, the mobile device 118 may show the bettor multiple events associated with those multiple devices. In some embodiments, this may be in a user's home. Some embodiments provide that the multiple events may occur in the context of a bar and/or in a sports book.

In some embodiments, the mobile device 118 may be notified of a commercial break and/or other break in the game play. The mobile device 118 may use this time to provide the bettor with additional wagering opportunities and/or functionality that takes time and would otherwise distract the bettor from the game. For example, the mobile device 118 may use a commercial break to remind the bettor about the outcome of a wager on another game or the mobile device 118 may use the time to show the bettor a current monetary balance. In some embodiments, the mobile device 118 may use the break to advertise a new feature and/or functionality of the sports wagering and/or casino system such as a new game or new wagering method. In some sporting events, the commercial break can be associated with key changes in the game, such as when a new quarter starts, a new half starts, or a new inning starts, and the bettor may be notified of this change and may be presented with new in-game betting opportunities associated with that state change in the sporting event being displayed on the television.

In some embodiments, the mobile device 118 may synchronize the television and/or set top box. In some embodiments, the bettor chooses a wager on the mobile device 118, such as wagering that the Dodgers will win against the Giants. The mobile device 118 can communicate with the sports wagering system and/or the set top box or television (either directly, or indirectly as discussed herein) to learn what game is currently being broadcasted and/or displayed on the television. The television or set top box can automatically switch to the sporting event (Dodgers vs Giants) associated with the bettor's selected wager. In some embodiments, the mobile device 118 can prompt the bettor to switch to the game ("View this event now?") or the set top box could prompt the bettor to switch to the sporting event via the television display.

Figure 2:
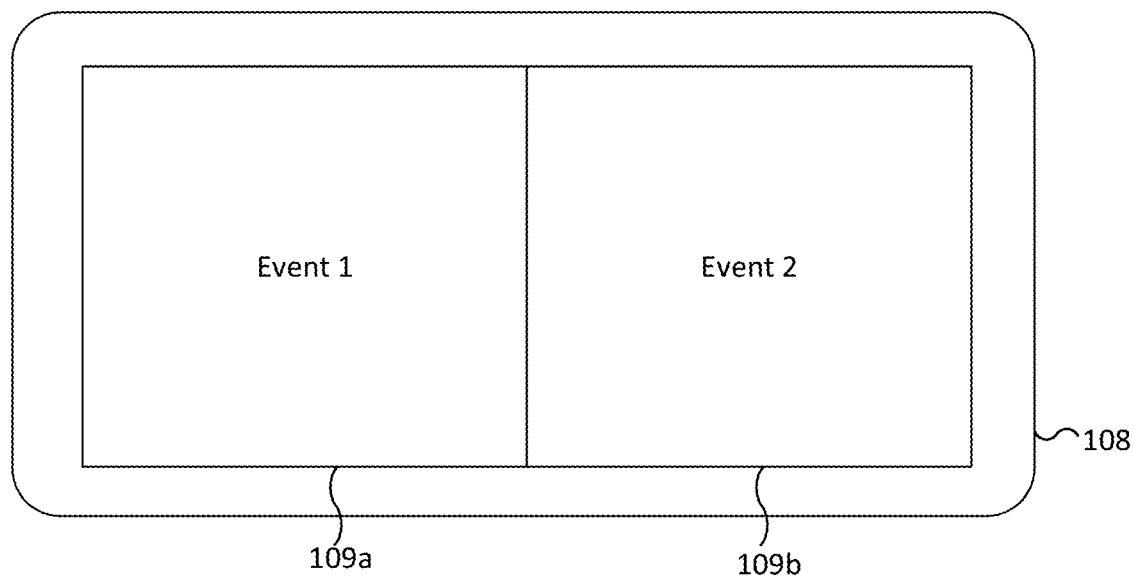
FIG. 2 is a schematic block diagram illustrating a screenshot displayed on an electronic display according to some embodiments herein.

In some embodiments, the bettor is wagering on multiple sporting events and the mobile device 118 informs the television 108, app of the television, set top box 110, or app of the set top box about multiple events being desired. Some embodiments provide that the television 108, app of the television, set top box 110, or app of the set top box may then automatically, or at the bettor's instruction show multiple live sports events simultaneously (i.e., picture in picture) associated with the bettor's wagers and/or a subset thereof. For example, brief reference is made to FIG. 2, which is a schematic block diagram illustrating a screenshot displayed on an electronic display 108 according to some embodiments herein. As illustrated, the screen shot displays Event 1 on display portion 109a and Event 2 on display portion 109b.

When multiple sporting events are shown, the mobile device 118 may notify the television 108, app of the television, set top box 110, or app of the set top box about the priority, status and state of each sporting event. The set top box 110 may show the sporting events or modify the volume of the sporting events accordingly. For example, the bettor may be wagering on 3 separate sporting events and the television 108, app of the television, set top box 110, or app of the set top box is showing all three sporting events. The mobile device 118 notifies the television 108, app of the television, set top box 110, or app of the set top box that a particular sporting event, such as a baseball game, is important now because the bettor has wagered that the next batter will strike out. The television 108, app of the television, set top box 110, or app of the set top box adjusts the picture in picture layout and volumes accordingly.

Figure 3:
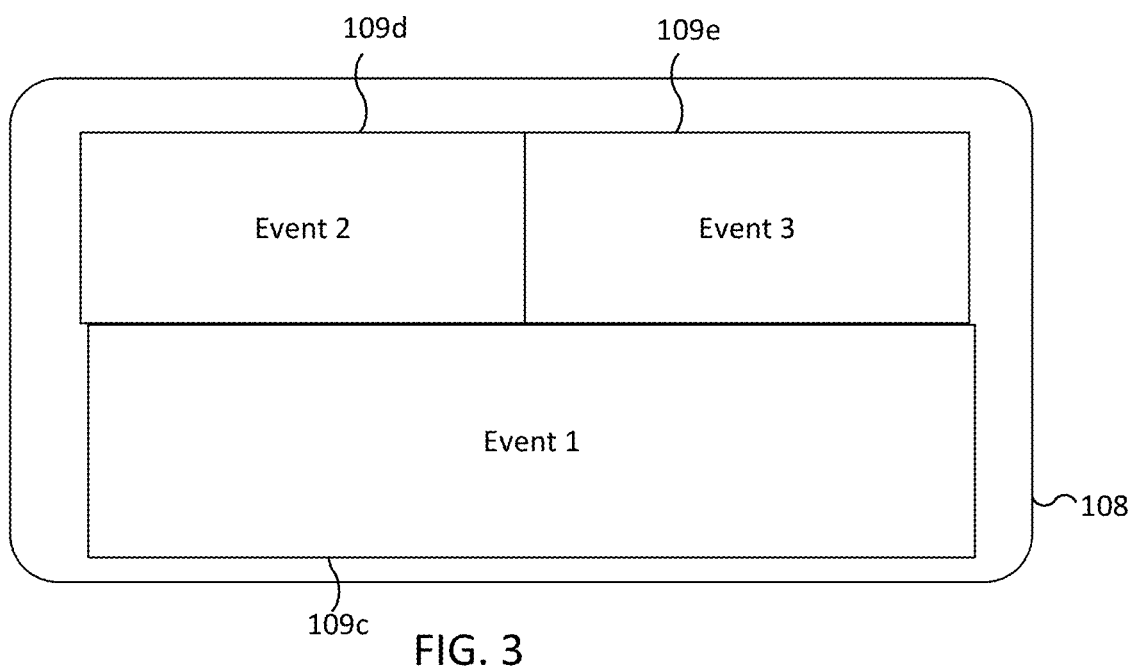
FIG. 3 is a schematic block diagram illustrating a screenshot displayed on an electronic display according to some embodiments herein.

Brief reference is made to FIG. 3, which is a schematic block diagram illustrating a screenshot displayed on an electronic display 108 according to some embodiments herein. For example, the display 108 shows Event 1 on display portion 109c larger than the other games corresponding to Event 2 and Event 3 at respective display portions 109d and 109e. In some embodiments, the audio of Event 1 may be the only audio played. When the wager is complete (after the batter is done), the mobile device 118 may instruct the set top box 110 to adjust back to the previous display arrangement. Other examples where such focus may offer bettors an engaging experience with their in-game wagers include at the end of a quarter (last minute or two minutes of the quarter), the half (last minute or two minutes of the half), of the top or bottom of an inning, such as when there are two outs and the count is full for the current batter, and/or when the last group of a golf tournament are on the 18$^{th}$ hole.

In some embodiments, the mobile device application may be in communication with the sports wagering system 104 and may be aware of the bettor account and thus all of the current and previous sports wagers made by the bettor. The mobile device 118 can communicate this information to the television 108, app of the television, set top box 110, or app of the set top box, to provide the information as an overlay to the event or to any display of the television 108. For example, the bettor may have one or more wagers on the current game or other games that may be shown. The television 108, app of the television, set top box 110 and/or app of the set top box overlays those wagers onto the television screen so the bettor is aware of the current wager and any related information about those wager (amount, description, terms, offers, any state information about the wager, etc.). Additionally, the mobile device application can share account information with the television 108, app of the television, set top box 110, or app of the set top box to display to the bettor such as current bettor account balance, bettor account number, bettor name or username, wagering stats (e.g., win %, number of wagers won/loss, etc.)

Figure 4:
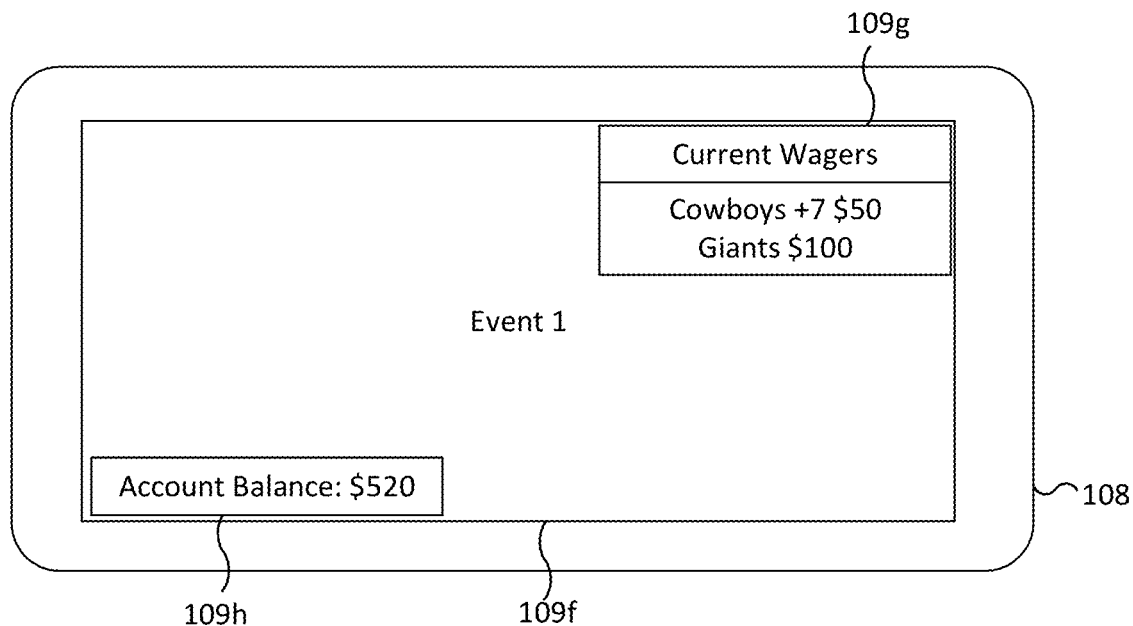
FIG. 4 is a schematic block diagram illustrating a screenshot displayed on an electronic display according to some embodiments herein.

Brief reference is made to FIG. 4, which is a schematic block diagram illustrating a screenshot displayed on an electronic display 108 according to some embodiments herein. As illustrated, the display portion 109f displays Event 1. Display portion 109h displays account information, such, as, for example, an account balance of the bettor's wagering account. Display portion 109g displays a list of current wagering activity including, for example, a list of wagers that are currently pending.

Figure 5:
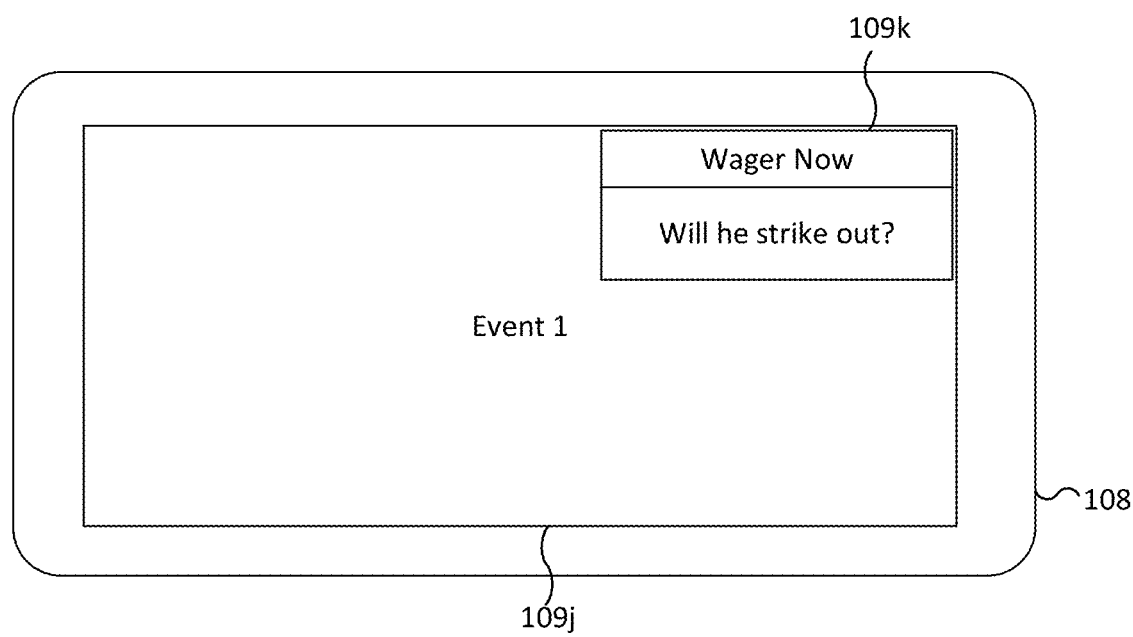
FIG. 5 is a schematic block diagram illustrating a screenshot displayed on an electronic display according to some embodiments herein.

Brief reference is made to FIG. 5, which is a schematic block diagram illustrating a screenshot displayed on an electronic display 108 according to some embodiments herein. In some embodiments, the mobile device 118 learns of an in-game wager available for the currently displayed game. The mobile device 118 notifies the television 108, app of the television, set top box 110, or app of the set top box to inform the bettor that an in-game wager is available on the mobile device application. For example, the display portion 109j displays Event 1 and display portion 109k displays an overlay that indicates that a wagering opportunity is available. In this manner, the television 108, app of the television, set top box 110, or app of the set top box may notify the bettor that there is an in-game wager available (e.g., "will the current batter strike out or not?") In the current example, the bettor may be offered to place a wager regarding an activity in the game, such as, whether a batter will strike out.

Figure 6:
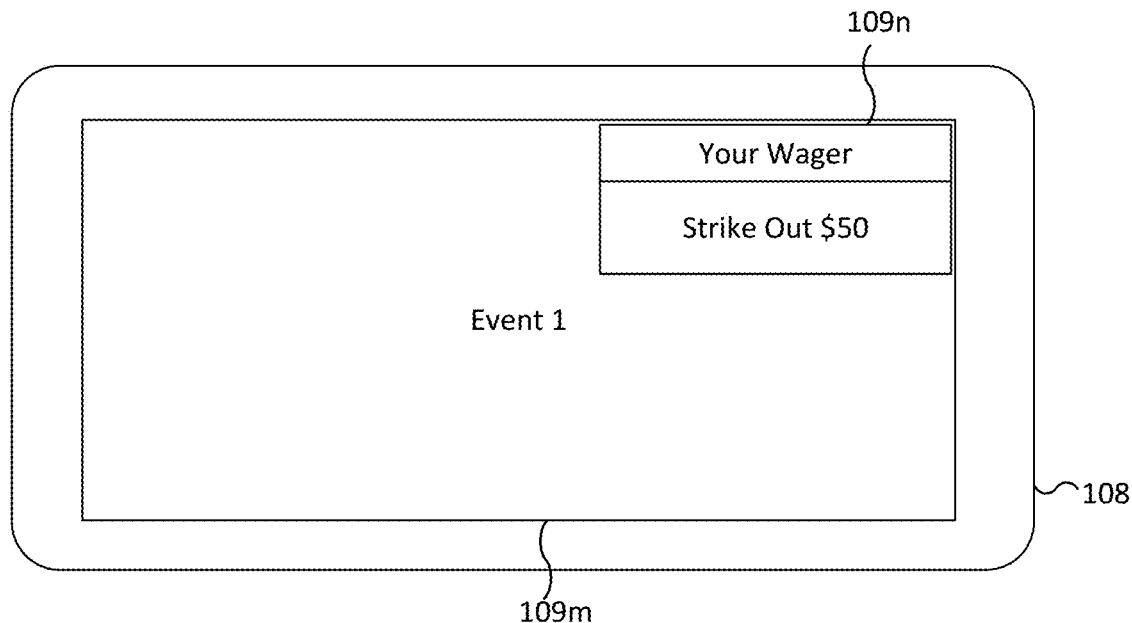
FIG. 6 is a schematic block diagram illustrating a screenshot displayed on an electronic display according to some embodiments herein.

Once the wager is made, an overlay may include data corresponding to the wager. Brief reference is now made to FIG. 6, which is a schematic block diagram illustrating a screenshot displayed on an electronic display 108 according to some embodiments herein. As illustrated, the display portion 109m displays Event 1 and display portion 109n displays an overlay that includes information regarding the wager.

Figure 7:
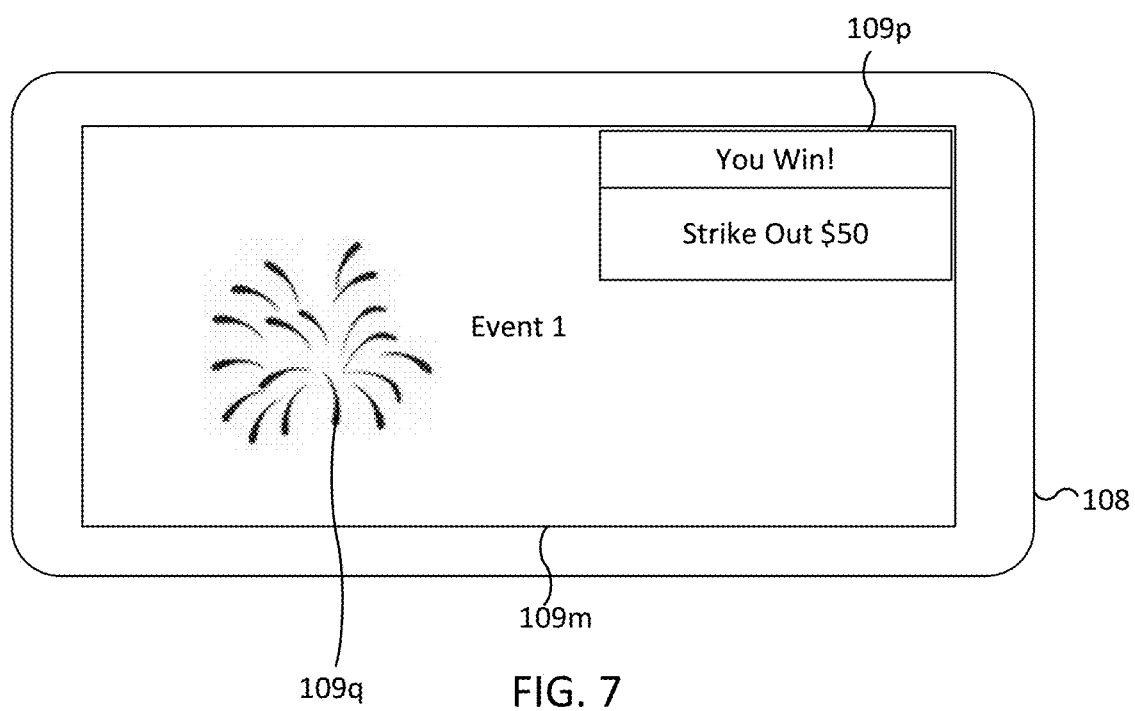
FIG. 7 is a schematic block diagram illustrating a screenshot displayed on an electronic display according to some embodiments herein.

Since the mobile device application is in communication with the sports wagering system, it may be aware of wins and losses by the bettor sports wagers. The television 108, app of the television, set top box 110, or app of the set top box can provide video and audio overlays to celebrate or otherwise display these outcomes. For example, the bettor wagers that the Dodgers will win against the Giants and when the game finishes, the television displays a celebration of fireworks and the amount won by the bettor. This celebration could be generic to celebrate a winning bet, and not identify the amount won. This can be useful in more public settings where others are also viewing the sporting event on the same display. For example, brief reference is now made to FIG. 7, which is a schematic block diagram illustrating a screenshot displayed on an electronic display 108 according to some embodiments herein. As illustrated, the display portion 109m displays Event 1 and display portion 109p displays an overlay that includes information regarding the outcome of the wager. Some embodiments include a celebration graphic 109q that is displayed based on winning the wager.

In some embodiments, more detailed outcome information can be displayed, such as telling the bettor the exact amount they won. This celebration can include not only video, but it can also include an audio overlay on top of the existing game (or games) audio to further enhance the celebration process.

During a commercial break, or time break in the sporting event, the mobile device 118 could notify the television 108, app of the television 108, set top box 110, or app of the set top box 110 to display certain information. In some embodiments, the information is a commercial, such as a commercial for the casino hosting the sports wagering system. The mobile device 118 could stream the information to the television 108, app of the television, set top box 110, or app of the set top box and/or provide it a URL for it to acquire the video or information to show the bettor on the television.

The mobile device 118 can vibrate or make sounds to capture the bettor's attention when wagering opportunities arise, such as the next event is about to happen, and the bettor can wager on the result of that event. In some embodiments, the television 108, app of the television, set top box 110, or app of the set top box notifies the mobile device 118 about a commercial and/or play break and the mobile device 118 vibrates or makes sound to capture the bettor's attention about a wagering event on a game that is not available on television.

Figure 8:
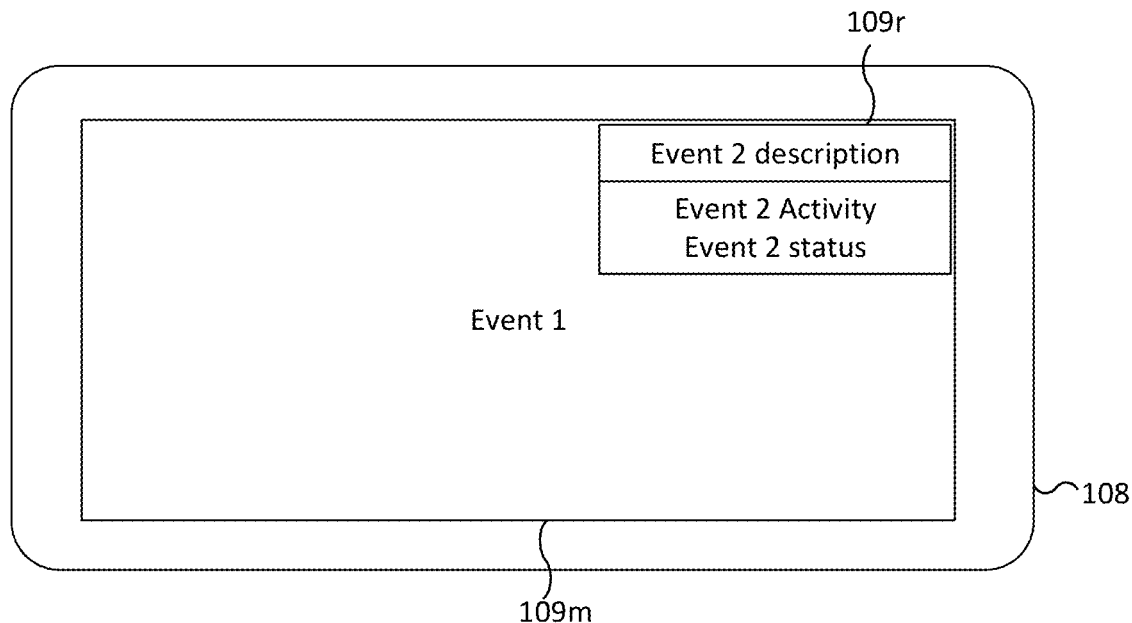
FIG. 8 is a schematic block diagram illustrating a screenshot displayed on an electronic display according to some embodiments herein.

In one embodiment, the television 108, app of the television, set top box 110, or app of the set top box and sports broadcasting system may not have one or more events available. For example, the Cowboys are playing the Raiders, but the game is not available for live viewing from the sports broadcasting system. The mobile device 118 may display the event by streaming it from any of a number of media streaming services. In some embodiments, the mobile device 118 can display text describing events happening in the event. In some embodiments, the mobile device 118 may send text describing events happening in the sporting event for the television 108, app of the television, set top box 110, or app of the set top box for display. In some embodiments, the live event is available, but the system may still provide a text description of the event to the set top box for display. An example of such embodiments is illustrated in FIG. 8, which is a schematic block diagram illustrating a screenshot displayed on an electronic display 108 according to some embodiments herein. As illustrated, display portion 109m displays Event 1 and display portion 109r displays a description of Event 2, an activity corresponding to Event 2 and/or status information corresponding to Event 2.

In some embodiments, the mobile device 118 shows the active live sporting events available on the television 108, app of the television, set top box 110, or app of the set top box and allows the bettor/user of the mobile device application to change channels on the television 108, app of the television, set top box 110, or app of the set top box using the mobile device application.

In some embodiments, the overlays may be included and/or removed in various manners. In some embodiments, the overlays may be displayed for a few seconds and go away as to not obstruct the view of the game(s). In some embodiments, the overlays change with state. For example, some embodiments provide that information is shown in between batters or during commercials, etc. when then game play is less interesting.

Figure 9:
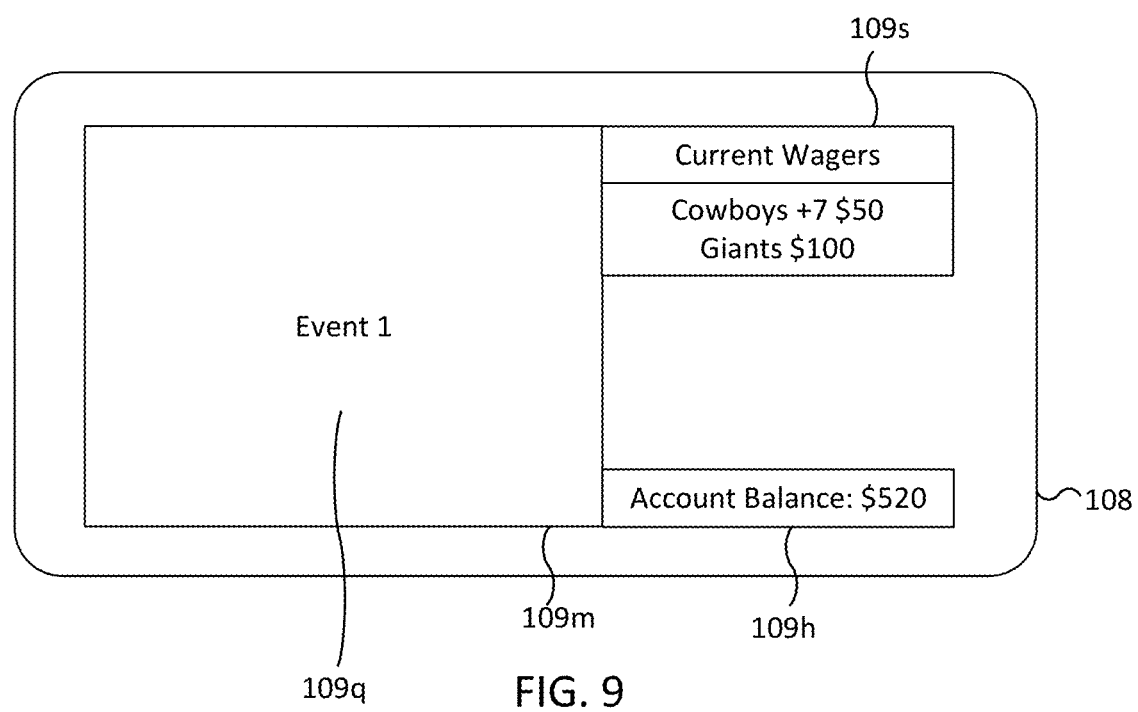
FIG. 9 is a schematic block diagram illustrating a screenshot displayed on an electronic display according to some embodiments herein.

In some embodiments, the overlays are on the sides of the current game and the current game is scaled down. This is illustrated in FIG. 9, which is a schematic block diagram illustrating a screenshot displayed on an electronic display 108 according to some embodiments herein. As illustrated, display portion 109q may display Event 1 and display portion 109s may display information, such as, for example, current wagers and/or account balances among others.

In some embodiments, the mobile device 118 learns a more important sporting event is starting and automatically or at the request of the bettor via a user prompt, switches the television 108, app of the television, set top box 110, or app of the set top box to the new sporting event. The new sporting event may be deemed more important by comparing the wagers, expected return, maximum return, win amount, statistics or other parameters of the currently viewed game and the new game. As previously described, the television 108, app of the television, set top box 110, or app of the set top box can still show information about the previously viewed game and the mobile device 118 can allow the user to switch back and forth between the games. In some embodiments, the new sporting event is considered more important based on an event in the game. For example, the Cowboys are down by 3 points against the Raiders. There is one minute to go in the game and the Cowboys are close to a touchdown. The mobile device 118 or sports wagering system 104 might consider this an important event and therefore consider switching to the Cowboys vs Raiders game.

In some embodiments, the mobile device 118 may instruct the television 108, app of the television, set top box 110, or app of the set top box to replay an event. This may be possible when the television 108, app of the television 108, set top box 110, or app of the set top box or the television broadcast system 102 supports continuous recording. The mobile device 118 may instruct the system to replay the last 15 seconds and/or to replay a specific time interval (e.g., from 30 seconds ago to 10 seconds ago or from 3:15:30 pm to 3:16:22 pm). The mobile device 118 may do this in response to the outcome of a wager. For example, in a circumstance in which the bettor wagers that the next batter will strike out, if the batter strikes out, the mobile device 118 may instruct the television 108, app of the television, set top box 110, or app of the set top box (directly, or indirectly via a back-end component) to replay the final strike out.

In some embodiments, the mobile device 118 may acquire the replay clip from the television 108, app of the television, set top box 110, or app of the set top box, or a back-end component in communications with one of those components. The mobile device application can then save the video on the mobile device 118 and/or assist the bettor with sharing the video on social media. For example, the bettor may wager that the next batter will strike, and the bettor wins the wager. The clip (or link to the clip) is sent to the mobile device 118 and the bettor can elect to share this on social media ("Strike Out! I won $100"). The mobile device 118, set top box or some component of the system might alter the clip, such as crop, slow down, add overlays, etc. In some embodiments, the clip is saved on the television 108, app of the television, set top box 110, or app of the set top box and sent to social media directly and not via the mobile device 118. In some embodiments, the clip is saved on the back-end of the television broadcasting system 102 and a link to the clip is sent to the mobile device 118 either directly or via communications between the display 108 or set top box 110 or application of the set top box or display and the sports wagering system 104.

Some embodiments provide that the mobile device 118 may be paired with the television 108, app of the television, set top box 110, or app of the set top box in accordance with some methods and systems herein. In some embodiments, the bettor may have multiple televisions or other electronic displays and may want to pair with one or more thereof.

In some embodiments, the pairing provides that the mobile device 118 sends a code to the television 108, app of the television, set top box 110, or app of the set top box. The code may be displayed to the bettor via the television. In some embodiments, the bettor may enter the code into the mobile device application manually and/or via a QR code.

In some embodiments, the pairing provides that the television 108, app of the television, set top box 110, or app of the set top box send a code to the mobile device 118. The code may be displayed to the bettor via the television 108. The bettor may enter the code into the mobile application manually and/or via a QR code.

In some embodiments, the set top box 110 has a user interface (via the television) to allow the user to find and pair to a mobile device 118.

Some embodiments provide that the pairing may end after a certain amount of time, when the bettor moves out of wireless range of the set top box 110, never or when the bettor chooses to unpair (via the mobile device 118). In some embodiments, the pairing may involve back-end components of the television 108, app of the television, set top box 110, or app of the set top box, such as the television broadcasting system 102, and/or a component thereof.

Some embodiments provide that multiple bettors might pair and/or use a common television 108 or common set of televisions. Examples of such circumstances may include a party or other gathering at a bettor's house, a sports bar and/or a sports book. In some embodiments, multiple bettors may attempt to watch a common game and wager on it using their own bettor wagering accounts. Previously described features such as pairing, synchronizing, and celebrations may all work in such configurations.

In some embodiments, each bettor can wager on individual plays or games. When a bettor wins, the television 108, app of the television, set top box 110 or app of the set top box can celebrate the win and show the winning bettor's name on the television 108 ("Strike Out! Bettor1 just won $50") and optionally the winning amount. The set top box 110 may have a summary and/or leader board with the success of the bettors listed. For example, brief reference is made to FIG. 10, which is a schematic block diagram illustrating a leaderboard according to some embodiments herein. According to some embodiments, the leaderboard may include a bettor column 111 that identifies bettors and a winning summary column 113 that includes summaries of wager winnings for the bettors. In some embodiments, the summary data may correspond to a specific time, location, event and/or group of participants.

In some embodiments, the leaderboard may show amount won or lost or the number of individual wagers won or lost, or other metric to share relative performance between the bettors at the current location.

In some embodiments, one or more top bettors on the leaderboard win some prize or achievement. For example, in a sports book, Bettor 2 could win $20 for winning the most during the Dodgers vs Giants game. In some embodiments, a bettor can be designated as the owner and/or administrator of the television 108, app of the television, set top box 110, or app of the set top box. The owner and/or administrator may associate a leaderboard with a prize and time box the prize. For example, the administrator could designate whoever wins the most on the super bowl gets a free jersey, and the leaderboard could be branded "Super Bowl Betting Jersey Contest".

In a large sports wagering venue, such as a sports bar, or sports book, bettors could conceivably be wagering on events that are displayed on multiple televisions throughout the venue. In such a venue, the bettor may not want to pair or associate their mobile device 118 with each individual display, but the bettor may still roam around the venue based upon the sporting event being displayed. In some embodiments, the bettor could check into the venue, and be instantly associated with all of the televisions of the venue. In some embodiments, some functionality may be restricted in this environment, such as the ability for a bettor to control each individual display. However, the bettor's wagers and wins can be displayed on the appropriate displays of the venue. In one embodiment, the bettor could be directed, via their PMD, to look at a particular television to see the result of their wager. In some embodiments, winning wagers of the bettor, or pending bets associated with key segments of a game, could be displayed only on televisions that the bettor is immediately adjacent to. This bettor location-based state of the television 108, app of the television, set top box 110, or app of the set top box, could be based upon determination of which bettors are nearby a display. In some embodiments, the bettor's mobile device 118 may find the displays in the immediate location of the bettor by sampling wireless broadcasts, and their relative signal strength, of televisions in the immediate vicinity of the bettor, and send a message to the adjacent displays to inform them that the bettor is in the immediate vicinity, thereby allowing the television 108, app of the television, set top box 110, or app of the set top box, to include the bettor in state changes of the display related to the bettor (such as displaying their winning bets, notifying them of key plays, etc). The television 108, app of the television, set top box 110, or app of the set top box may timeout a particular bettor if a message or signal from their PMD hasn't been received within a timeout period, which would indicate the bettor has left the immediate area.

In some embodiments, the television 108, app of the television, set top box 110, or app of the set top box could implement much of the previously mentioned functionality natively, and the bettor could interface with that functionality via a traditional remote control device, keyboard, mouse, voice control, or other user interface element. In this model, the bettor may associate their wagering account with the television 108, app of the television, set top box 110, or app of the set top box, (using traditional on-screen account association methods such as logging into their account on-screen, or displaying a code on screen and logging in with that code online using a mobile device) and then the bettor can view their wagering account balance, currently placed wagers, and/or can place additional wagers. The bettor can then use on-screen controls (or gestures, voice, etc.) to select the sporting event to display, either directly, by navigating to the sporting events eligible to place bets on, or by navigating to the wagers the bettor has previously placed. The television 108, app of the television, set top box 110, or app of the set top box, may then display the previously mentioned celebrations when a bettor wins a previously placed wager, change the display to catch the last play or key moment when a bettors wager will be decided, and/or display multiple sporting events (in picture-in-picture) mode associated with wagers the bettor has previously placed and/or is interested in.

Figure 11:
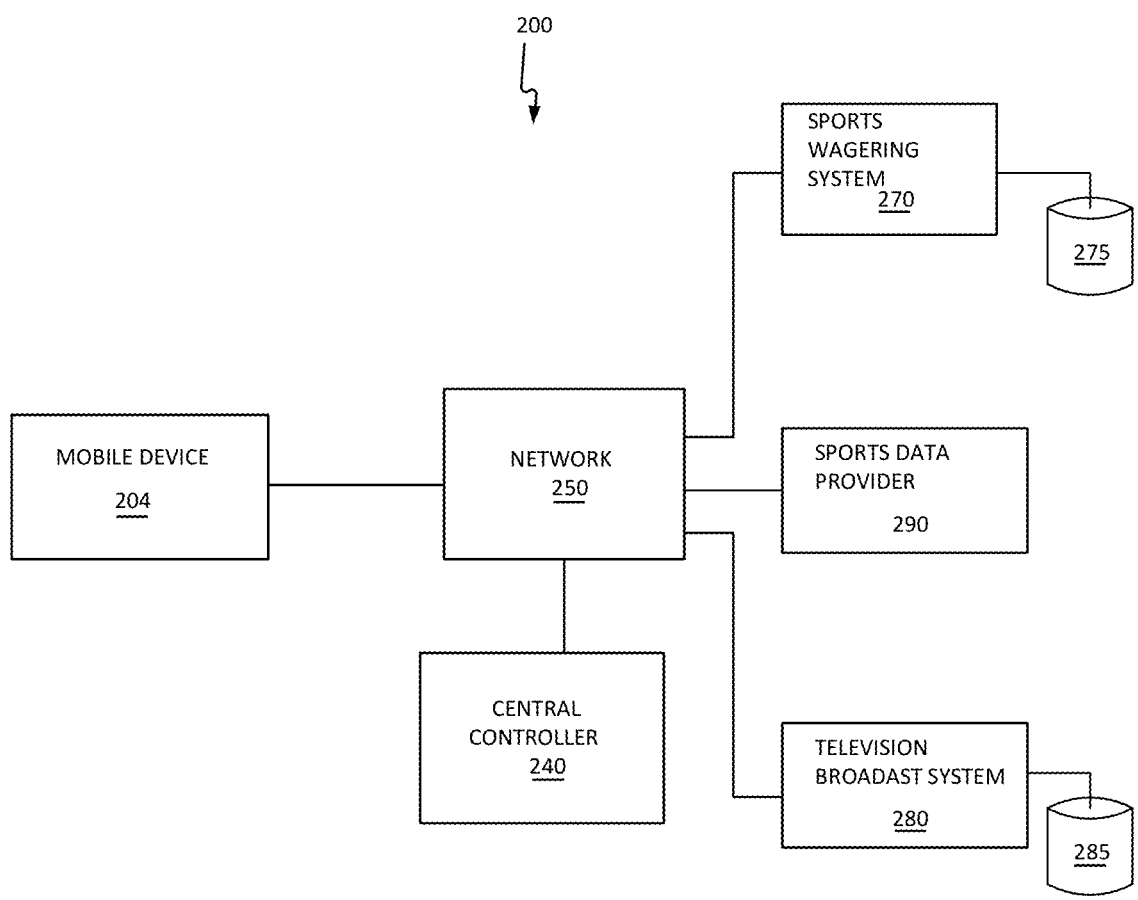
FIG. 11 is a schematic block diagram illustrating network configurations for a system including a sports wagering system and a television broadcasting system according to some embodiments.

Reference is now made to FIG. 11, which a schematic block diagram illustrating network configurations for a system including a sports wagering system and a television broadcasting system according to some embodiments. The system 200 may include a mobile device 204 and a central controller 240 for providing an integration of sports wagering system 270 and a television broadcasting system 280 to a user via the mobile device 204. In this example, the mobile device 204 is connected to the central controller 240 via a network 250, but it should be understood that the central controller 240 in some embodiments may be part of the mobile device 204 or may be connected to the mobile device 204 via a direct wired or wireless connection as well. A sports wagering system 270 and a television broadcasting system 280 are also connected to the central controller 240 via the network 250 in this example.

In some embodiments, a sports data provider 290 may evaluate the outcomes of events related to in-play wagers and provide an indication regarding the outcome of the wagers. In some embodiments, the sports data provider 290 may provide a set of results corresponding to given events in the sports games. For example, in the context of football, a set of results may include data corresponding to run, pass, number of yards lost or gained, player number, play type correlation, line of scrimmage, and/or occurrences such as fumble, foul, interception, and/or scoring, among others. Any of the mobile device 204, the central controller 240, and the television broadcast system 280 may use the sports data from the sports data provider 290 to resolve the outcomes of in-play wagers.

Figure 12:
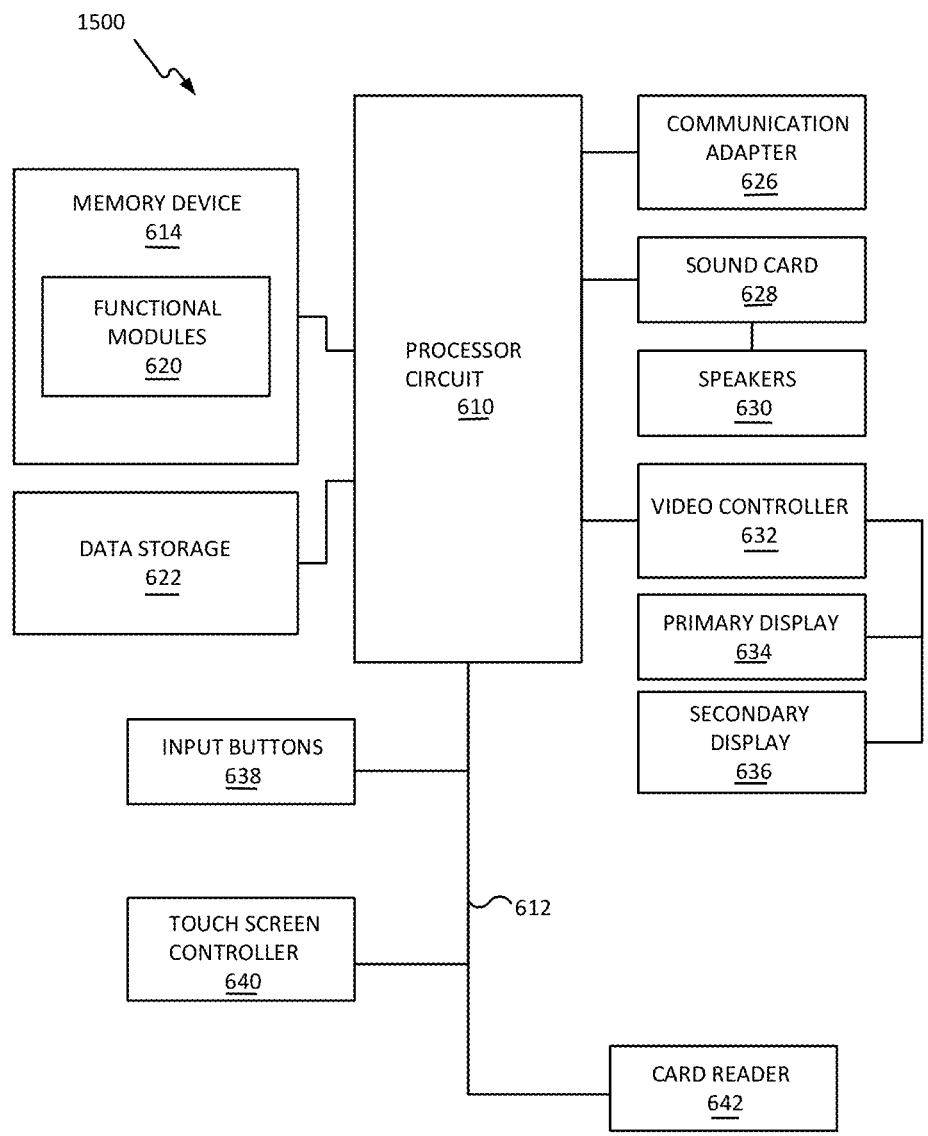
FIG. 12 is a schematic block diagram that illustrates various components of a computing device, which may embody or be included as part of the devices, systems, and/or components above, according to some embodiments.

Reference is now made to FIG. 12, which is a schematic block diagram that illustrates various components of a computing device, which may embody or be included as part of the devices, systems, and/or components above, according to some embodiments. As shown in FIG. 12, the computing device 1500 may include a processor circuit 610 that controls operations of the computing device 1500. Although illustrated as a single processor, multiple special purpose and/or general-purpose processors and/or processor cores may be provided in the computing device 1500. For example, the computing device 1500 may include one or more of a video processor, a signal processor, a sound processor and/or a communication controller that performs one or more control functions within the computing device 1500. The processor circuit 610 may be variously referred to as a "controller," "microcontroller," "microprocessor" or simply a "computer." The processor circuit 610 may further include one or more application-specific integrated circuits (ASICs).

Various components of the computing device 1500 are illustrated in FIG. 12 as being connected to the processor circuit 610. It will be appreciated that the components may be connected to the processor circuit 610 and/or each other through one or more busses 612 including a system bus, a communication bus and controller, such as a USB controller and USB bus, a network interface, or any other suitable type of connection.

The computing device 1500 further includes a memory device 614 that stores one or more functional modules 620 for performing the operations described above. Alternatively, or in addition, some of the operations described above may be performed by other devices connected to the network. The computing device 1500 may communicate with other devices connected to the network to facilitate performance of some of these operations. For example, the computing device 1500 may communicate and coordinate with certain displays to identify elements of a race being displayed by a particular display.

The memory device 614 may store program code and instructions, executable by the processor circuit 610, to control the computing device 1500. The memory device 614 may include random access memory (RAM), which can include non-volatile RAM (NVRAM), magnetic RAM (ARAM), ferroelectric RAM (FeRAM) and other forms as commonly understood in the gaming industry. In some embodiments, the memory device 614 may include read only memory (ROM). In some embodiments, the memory device 614 may include flash memory and/or EEPROM (electrically erasable programmable read only memory). Any other suitable magnetic, optical and/or semiconductor memory may operate in conjunction with the gaming device disclosed herein.

The computing device 1500 may include a communication adapter 626, which may also be referred to as a communication interface and that enables the computing device 1500 to communicate with remote devices, such as the wireless network, another computing device 1500, and/or a wireless access point, over a wired and/or wireless communication network, such as a local area network (LAN), wide area network (WAN), cellular communication network, or other data communication network.

The computing device 1500 may include one or more internal or external communication ports that enable the processor circuit 610 to communicate with and to operate with internal or external peripheral devices, such as a sound card 628 and speakers 630, video controllers 632, a primary display 634, a secondary display 636, input buttons 638 or other devices such as switches, keyboards, pointer devices, and/or keypads, a touch screen controller 640, a card reader 642, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 610. Although illustrated as being integrated with the computing device 1500, any of the components therein may be external to the computing device 1500 and may be communicatively coupled thereto. Although not illustrated, the computing device 1500 may further include a rechargeable and/or replaceable power device and/or power connection to a main power supply, such as a building power supply.

In some embodiments, the computing device 1500 may include a head mounted device (HMD) and may include optional wearable add-ons that include one or more sensors and/or actuators. Including ones of those discussed herein. The computing device 1500 may be a head-mounted mixed-reality device configured to provide mixed reality elements as part of a real-world scene being viewed by the user wearing the computing device 1500. Some embodiments provide that the mixed-reality device (augmented reality device) may just be a mobile device that may be handheld without a headset. Also, the mixed-reality device may be the same as the computing device 1500. In some embodiments, the mixed-reality device is the computing device 1500 itself. Examples include AR glasses without any mobile device.

Figure 13:
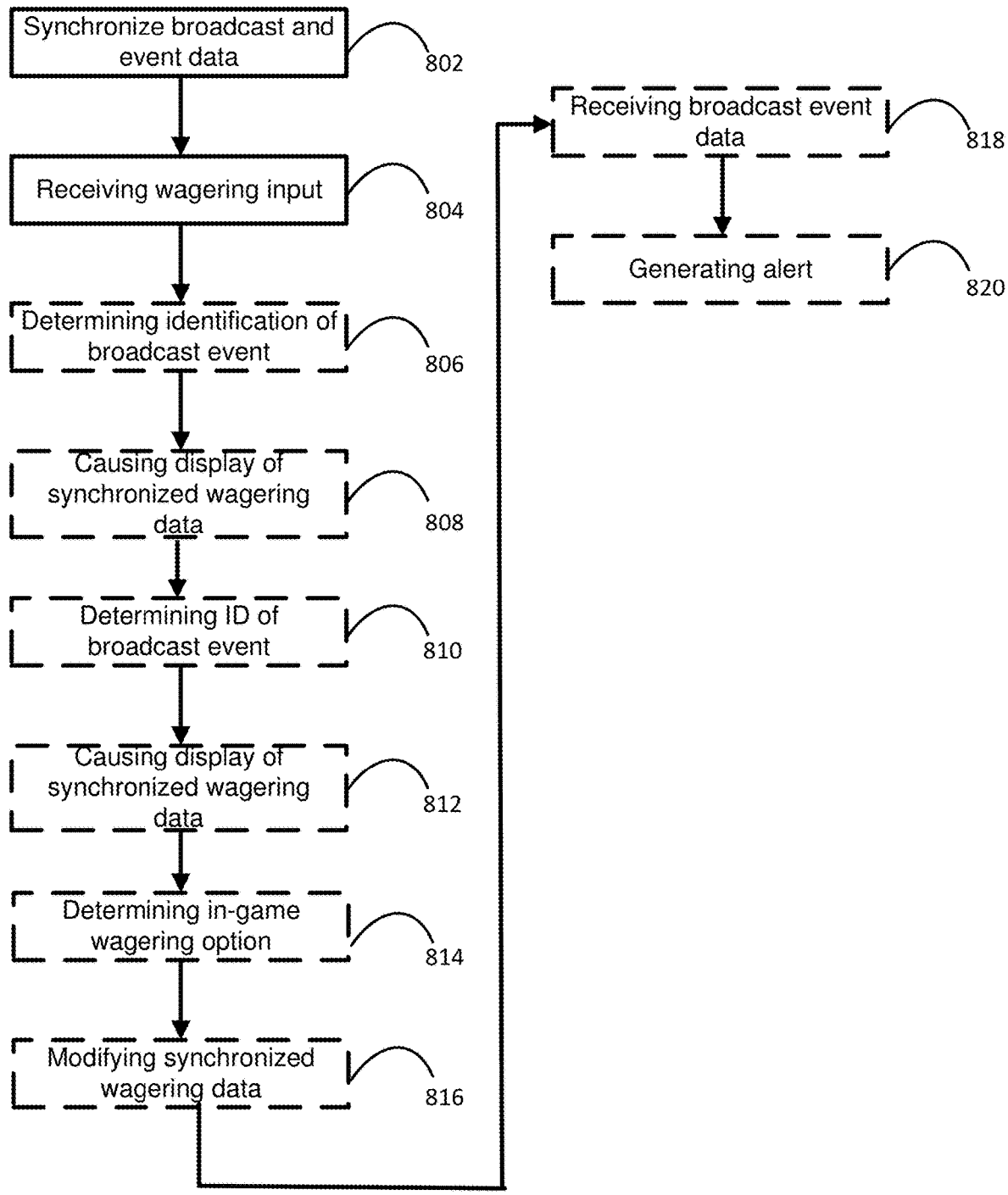
FIG. 13 is a flowchart illustrating operations of systems/methods/apparatus according to some embodiments.

Reference is now made to FIG. 13, which is a flowchart illustrating operations of systems/methods/servers according to some embodiments. For example, some embodiments are directed to a server that includes a processor circuit and a memory coupled to the processor circuit. The memory may include machine readable instructions that, when executed by the processor circuit, cause the processor circuit to operate to performed operations including synchronizing (block 802) broadcast event data that is displayed on an electronic display with wagering system data that is provided by a wagering system. The synchronization may provide synchronized wagering data. Embodiments may include receiving (block 804, via a mobile device, a wagering input that corresponds to the synchronized wagering data.

In some embodiments, the broadcast event data includes an identification of an event being broadcasted using the electronic display. Some embodiments provide that synchronizing the broadcast event data that corresponds to a broadcast event includes determining (block 806) the identification of the broadcast event on the electronic display and causing (block 808) the electronic display to display the synchronized wagering data that is based on the identification of the event.

In some embodiments, the identification of the event is determined by optical data that is received responsive to the mobile device capturing image data that includes the identification of the broadcast event. Some embodiments provide that the identification of the event includes a first identification of a first event at a first time and a second identification of a second event at a second time that is after the first time. In some embodiments, in responsive to the identification of the event changing from the first identification to the second identification, wagering system data changes from first wagering system data that is associated with the first event to second wagering system data that is associated with the second event.

In some embodiments, the second event includes a commercial message and the second wagering system data includes summary wagering data that corresponds to historical wagering data. Some embodiments provide that the second event includes a commercial message and the second wagering system data includes an advertisement of a feature of the wagering system.

In some embodiments, the wagering system data includes a wagering event on the mobile device. In such embodiments, synchronizing the broadcast event data includes determining (block 810) an identification of the broadcast event based on the wagering system data on the mobile device, and causing (block 812) the electronic display to display the synchronized wagering data that is based on the identification of the wagering event on the mobile device. In some embodiments, causing the electronic display to display the synchronized wagering data that is based on the identification of the wagering event on the mobile device includes causing the mobile device to communicate directly with the electronic display.

In response to a change of the broadcast event data from first broadcast event data to second broadcast event data on the electronic display, some embodiments provide that the synchronized wagering data is updated from first synchronized wagering data to include second synchronized wagering data that is different from the first synchronized wagering data.

In some embodiments, the wagering system data that is provided by the wagering system is associated with multiple broadcast events. Some embodiments provide that, in response to the broadcast events, the broadcast event data includes multiple broadcast events to be displayed on multiple portions of the electronic display. In some embodiments, each of the portions of the electronic display includes the synchronized wagering data corresponding to the multiple broadcast events.

Some embodiments provide further include determining (block 814) that an in-game wagering option is available for a currently displayed event and modifying (block 816) the synchronized wagering data to include the in-game wagering option on the electronic display with the broadcast event data.

Some embodiments include receiving (block 818) the broadcast event data based on a communication that is generated by the mobile device and that is based on a communication between the mobile device and the electronic display.

In some embodiments, in response to the broadcast event data displaying content that corresponds to an existing wager, the synchronized wagering data may be caused to include a graphical display overlaying displayed images that corresponds to content that corresponds to an outcome of the existing wager.

Some embodiments provide that the synchronized wagering data includes the broadcast event data and the wagering system data. In some embodiments, when displayed as the synchronized wagering data, the wagering system data is displayed as overlaying the broadcast event data. Some embodiments provide that in response to receiving a change in the wagering system data, the mobile device is configured to generate (block 820) an alert.

In some embodiments, the electronic display includes a single electronic display. In some embodiments, the mobile device includes multiple mobile devices and multiple bettors watch a common event on the electronic display. In some embodiments, the multiple mobile devices are configured to receive wagers corresponding to the common event and the electronic display is caused to display wager outcome data corresponding to the wagers received via the mobile devices. Some embodiments provide that the wager outcome data corresponding to the wagers received via the mobile devices includes a leaderboard that displays relative wagering performance.

Figure 14:
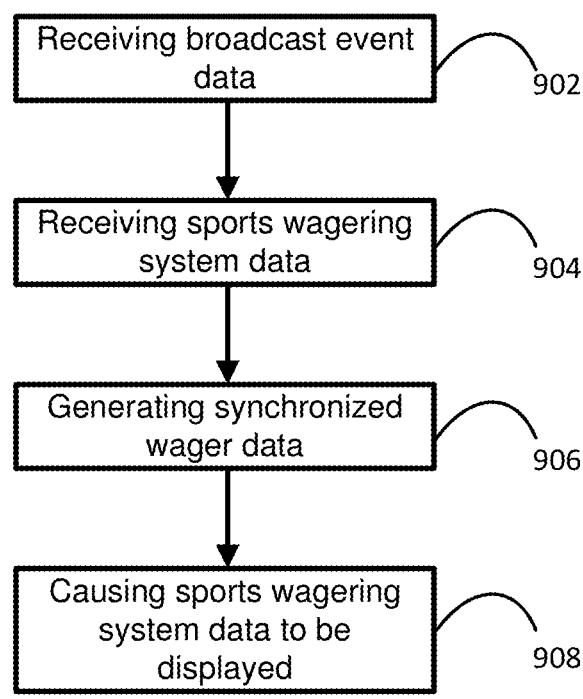
FIG. 14 is a flowchart illustrating operations of systems/methods/apparatus according to some embodiments.

Reference is now made to FIG. 14, which is a flowchart illustrating operations of systems/methods/servers according to some embodiments. Operations include receiving (block 902), by a synchronization server, broadcast event data that is displayed on an electronic display and that is generated by a television broadcasting system. Some embodiments include receiving (block 904), by the synchronization server, sports wagering system data that is generated by a sports wagering system and that corresponds to a broadcast event. In some embodiments, the sports wager system data includes current wager data and in-game wager opportunities.

Operations may include generating (block 906) synchronized wager data that includes the broadcast event data and the sports wagering system data and causing (block 908) the sports wagering system data to be displayed on the electronic display.

Figure 15:
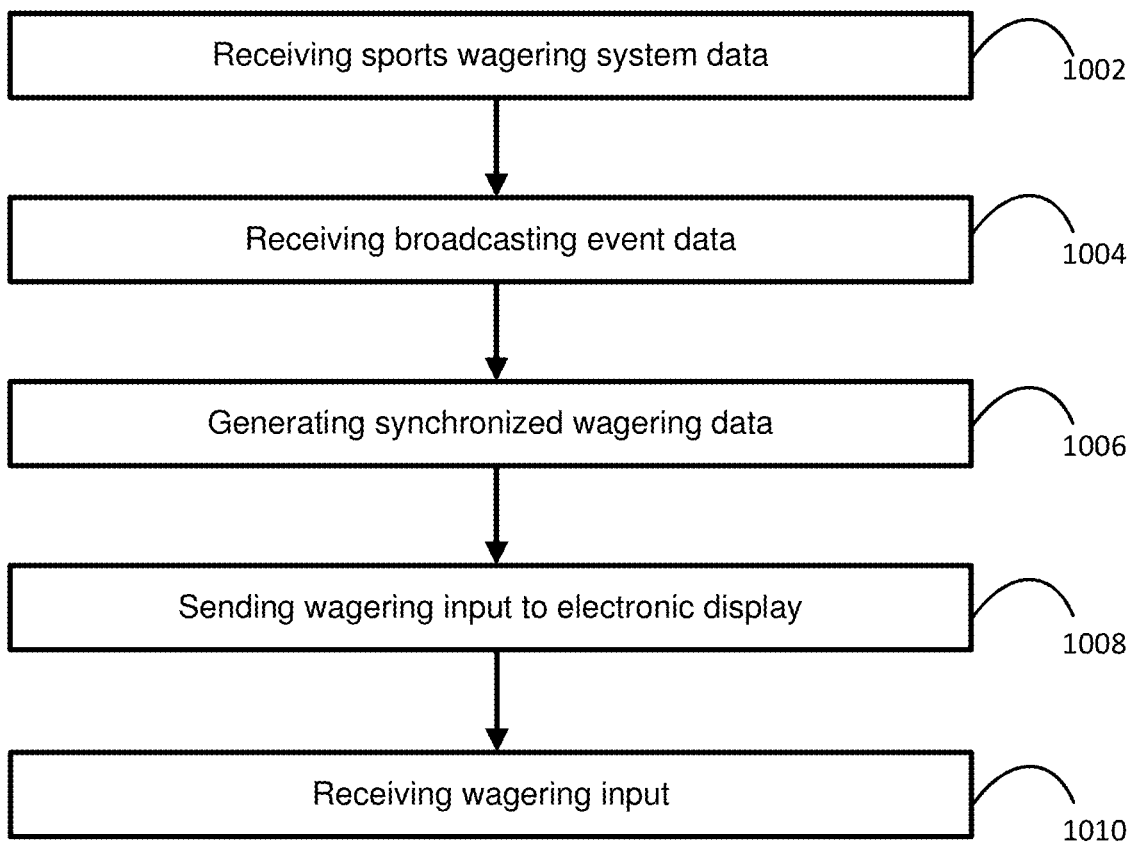
FIG. 15 is a flowchart illustrating operations of systems/methods/apparatus according to some embodiments.

Reference is now made to FIG. 15, which is a flowchart illustrating operations of systems/methods/servers according to some embodiments. Operations may be performed by a mobile device and may include receiving (block 1002) sports wagering system data from a sports wagering service and receiving (block 1004) broadcasting event data that is provided by a television broadcasting service. Operations may include generating (block 1006) synchronized wager data that causes an electronic display to display a broadcasting event corresponding to the broadcast event data and sports wager data that is associated with the broadcast event. Some embodiments provide sending (block 1008) the synchronized wager data to the electronic display and receiving (block 1010) a wagering input that corresponds to the synchronized wagering data.

Embodiments herein are directed to various systems, devices and methods for sports betting that use graphical user input techniques to provide synchronization of sports wagering data and broadcast television content, for placing a sports wager on a live sporting event during the live sporting event.

These and other features may be implemented as operations that may be executed by a processor circuit of a computing device.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A server comprising:
a processor circuit; and
a memory coupled to the processor circuit, the memory comprising machine readable instructions that, when executed by the processor circuit, cause the processor circuit to operate to:
synchronize broadcast event data that is displayed on an electronic display with wagering system data that is provided by a wagering system to provide synchronized wagering data; and
receive, via a mobile device, a wagering input that corresponds to the synchronized wagering data,
wherein the broadcast event data comprises an identification of an event being broadcasted using the electronic display, and
wherein to synchronize the broadcast event data that corresponds to a broadcast event, the processor circuit is further caused to:
determine the identification of the broadcast event on the electronic display, and
cause the electronic display to display the synchronized wagering data that is based on the identification of the event.

2. The server of claim 1, wherein the identification of the event is determined by optical data that is received responsive to the mobile device capturing image data that comprises the identification of the broadcast event.

3. The server of claim 1,
wherein the identification of the event comprises a first identification of a first event at a first time and a second identification of a second event at a second time that is after the first time, and
wherein responsive to the identification of the event changing from the first identification to the second identification, wagering system data changes from first wagering system data that is associated with the first event to second wagering system data that is associated with the second event.

4. The server of claim 3, wherein the second event comprises a commercial message and the second wagering system data comprises summary wagering data that corresponds to historical wagering data.

5. The server of claim 3, wherein the second event comprises a commercial message and the second wagering system data comprises an advertisement of a feature of the wagering system.

6. A server comprising:
a processor circuit; and
a memory coupled to the processor circuit, the memory comprising machine readable instructions that, when executed by the processor circuit, cause the processor circuit to operate to:
synchronize broadcast event data that is displayed on an electronic display with wagering system data that is provided by a wagering system to provide synchronized wagering data; and
receive, via a mobile device, a wagering input that corresponds to the synchronized wagering data,
wherein the wagering system data comprises a wagering event on the mobile device, and
wherein to synchronize the broadcast event data, the processor circuit is further caused to:
determine an identification of the broadcast event based on the wagering system data on the mobile device, and
cause the electronic display to display the synchronized wagering data that is based on the identification of the wagering event on the mobile device.

7. The server of claim 6, wherein causing the electronic display to display the synchronized wagering data that is based on the identification of the wagering event on the mobile device comprises causing the mobile device to communicate directly with the electronic display.

8. A server comprising:
a processor circuit; and
a memory coupled to the processor circuit, the memory comprising machine readable instructions that, when executed by the processor circuit, cause the processor circuit to operate to:
synchronize broadcast event data that is displayed on an electronic display with wagering system data that is provided by a wagering system to provide synchronized wagering data; and
receive, via a mobile device, a wagering input that corresponds to the synchronized wagering data, wherein responsive to a change of the broadcast event data from first broadcast event data to second broadcast event data on the electronic display, the synchronized wagering data is updated from first synchronized wagering data to comprise second synchronized wagering data that is different from the first synchronized wagering data.

9. The server of claim 1,
wherein the wagering system data that is provided by the wagering system is associated with a plurality of broadcast events, and
wherein, responsive to the plurality of broadcast events, the broadcast event data comprises a plurality of broadcast events to be displayed on a plurality of portions of the electronic display, and
wherein each of the portions of the electronic display comprises the synchronized wagering data corresponding to the plurality of broadcast events.

10. The server of claim 1, wherein the processor circuit is further caused to:
determine that an in-game wagering option is available for a currently displayed event, and modify the synchronized wagering data to comprise the in-game wagering option on the electronic display with the broadcast event data.

11. The server of claim 1, wherein the processor circuit is further caused to receive the broadcast event data based on a communication that is generated by the mobile device and that is based on a communication between the mobile device and the electronic display.

12. The server of claim 1, wherein responsive to the broadcast event data displaying content that corresponds to an existing wager, the processor circuit further causes the synchronized wagering data to comprise a graphical display overlaying displayed images that corresponds to content that corresponds to an outcome of the existing wager.

13. The server of claim 1, wherein the synchronized wagering data comprises the broadcast event data and the wagering system data, wherein, when displayed as the synchronized wagering data, the wagering system data is displayed as overlaying the broadcast event data.

14. The server of claim 1, wherein, responsive to receiving a change in the wagering system data, the mobile device is configured to generate an alert.

15. The server of claim 1, wherein the electronic display comprises a single electronic display, wherein the mobile device comprises a plurality of mobile devices, wherein a plurality of bettors watch a common event on the electronic display, wherein the plurality of mobile devices are configured to receive wagers corresponding to the common event, and wherein the electronic display is caused to display wager outcome data corresponding to the wagers received via the plurality of mobile devices.

16. The server of claim 15, wherein the wager outcome data corresponding to the wagers received via the plurality of mobile devices comprises a leaderboard that displays relative wagering performance.

* * * * *